(12) United States Patent
Sim et al.

(10) Patent No.: US 12,549,750 B2
(45) Date of Patent: *Feb. 10, 2026

(54) VIDEO ENCODING AND DECODING METHOD AND DEVICE

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Han Sol Choi, Gyeonggi-do (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,820

(22) Filed: Sep. 10, 2024

(65) Prior Publication Data

US 2024/0430469 A1 Dec. 26, 2024

Related U.S. Application Data

(63) Continuation of application No. 17/294,137, filed as application No. PCT/KR2020/006419 on May 15, 2020, now Pat. No. 12,120,334.

(30) Foreign Application Priority Data

May 15, 2019 (KR) .................. 10-2019-0056973
Sep. 30, 2019 (KR) .................. 10-2019-0121030
May 15, 2020 (KR) .................. 10-2020-0058245

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/117* (2014.11);
(Continued)

(58) Field of Classification Search
CPC .... H04N 19/44; H04N 19/105; H04N 19/117; H04N 19/119; H04N 19/176; H04N 19/82; H04N 19/96; H04N 19/70
(Continued)

(56) References Cited

U.S. PATENT DOCUMENTS

2016/0269684 A1 9/2016 Lim et al.
2018/0192074 A1 7/2018 Shih et al.
(Continued)

FOREIGN PATENT DOCUMENTS

KR 10-2015-0083012 A 7/2015
KR 10-2018-0028299 A 3/2018
KR 10-2019-0029735 A 3/2019

OTHER PUBLICATIONS

Choi, B., "AHG12: On sub-picture partitioning", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0055-v2, 8 pages.

(Continued)

*Primary Examiner* — Matthew K Kwan
(74) *Attorney, Agent, or Firm* — Fox Rothschild LLP

(57) ABSTRACT

For encoding and decoding images, an image encoding device divides each picture into sub-pictures that can be (Continued)

(a)

(b)

(c)

independently displayed, and signals layout information about the sub-pictures, and an image decoding device identifies each sub-block through the layout information and decodes the sub-pictures. A video decoding apparatus and method are configured to decode a bitstream containing an encoded sequence of pictures which are partitioned into a plurality of subpictures including a plurality of coding tree blocks.

8 Claims, 8 Drawing Sheets

(51) Int. Cl.
    *H04N 19/117*     (2014.01)
    *H04N 19/119*     (2014.01)
    *H04N 19/176*     (2014.01)
    *H04N 19/82*     (2014.01)
    *H04N 19/96*     (2014.01)

(52) U.S. Cl.
    CPC ......... *H04N 19/119* (2014.11); *H04N 19/176* (2014.11); *H04N 19/82* (2014.11); *H04N 19/96* (2014.11)

(58) Field of Classification Search
    USPC .................................................. 375/240.25
    See application file for complete search history.

(56) References Cited

U.S. PATENT DOCUMENTS

| | | |
|---|---|---|
| 2018/0199002 A1 | 7/2018 | Tung et al. |
| 2019/0191170 A1 | 6/2019 | Zhao et al. |
| 2019/0373287 A1 | 12/2019 | Lim et al. |
| 2020/0074687 A1 | 3/2020 | Lin |
| 2021/0211665 A1 | 7/2021 | Gao et al. |
| 2021/0409785 A1 | 12/2021 | Wang et al. |

OTHER PUBLICATIONS

Notification of First Office Action for Chinese Patent Application No. 2020800361179, from China Intellectual Property Administration, dated Dec. 18, 2023, 42 pages, with English translation.
Versatile Video Coding (Draft 5), 1 page.
English Translation of KR20180028299A (2018).
International Search Report mailed Aug. 20, 2020, in corresponding PCT Application No. PCT/KR2020/006419.
B. Choi et al., "AHG12: On sub-picture partitioning JVET-N0055-v2 Joint Video Experts Teat (JVET) of ITU-T SG 16 WP 3 and ISO/IEC JTC 1/SC 29/WG 11", 14th Meeting, Geneva, CH, Mar. 20, 2019, pp. 1-7.

VIDEO ENCODING AND DECODING METHOD AND DEVICE

CROSS-REFERENCE TO RELATED APPLICATION

This Application is a continuation of U.S. patent application Ser. No. 17/294,137, filed on May 14, 2021, which is a National Phase application filed under 35 USC 371 of PCT International Application No. PCT/KR2020/006419 with International Filing Date of May 15, 2020, which claims under 35 U.S.C. § 119(a) the benefit of Korean Patent Application No. 10-2019-0056973 filed May 15, 2019, Korean Patent Application No. 10-2019-0121030 filed on Sep. 30, 2019, and Korean Patent Application No. 10-2020-0058245 filed on May 15, 2020, the entire contents of which are incorporated herein by reference.

BACKGROUND

(a) Technical Field

The present disclosure relates to encoding and decoding a video, more particularly, to partitioning each picture into independently displayable subpictures and encoding and decoding each subpicture.

(b) Description of the Related Art

Since the volume of video data typically is larger than that of voice data or still image data, storing or transmitting video data without processing for compression requires a significant amount of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, for video data, the size, resolution, and frame rate of video are gradually increasing, and thus the amount of data to be encoded is also increasing. Accordingly, a new compression technique having better encoding efficiency and higher image quality than the existing compression technique is required.

In addition, due to the advent of various applications such as 360 video, a technology for not only displaying the entire area of a decoded picture but also a partial area of the picture is required.

SUMMARY

The present disclosure is directed to a technique for partitioning each picture into subpictures that can be displayed independently from each other, and a technique for encoding and decoding each subpicture.

In accordance with one aspect of the present disclosure, a video decoding method for decoding a bitstream containing an encoded sequence of pictures partitioned into a plurality of subpictures each of which includes a plurality of coding tree blocks. The method includes decoding, from the bitstream, layout information about the partitioned subpictures from the pictures included in the sequence; splitting, in a tree structure, a coding tree block of the plurality of coding tree blocks to be decoded in any one of the subpictures identified by the layout information and determining a target block; decoding, from the bitstream, prediction information for predicting the target block and information about residual signals of the target block; predicting pixels in the target block based on the prediction information and generating a prediction block; generating a residual block for the target block based on information about the residual signals; and reconstructing the target block by adding the prediction block and the residual block.

In accordance with another aspect of the present disclosure, a video decoding apparatus for decoding a bitstream containing an encoded sequence of pictures partitioned into a plurality of subpictures each of which includes a plurality of coding tree blocks. The apparatus includes a decoder configured to decode, from the bitstream, layout information about the partitioned subpictures from the pictures included in the sequence, split, in a tree structure, a coding tree block of the plurality of coding tree blocks to be decoded in any one of the subpictures identified by the layout information and determine a target block, and decode, from the bitstream, prediction information for predicting the target block and information about residual signals of the target block; a predictor configured to predict pixels in the target block based on the prediction information and generating a prediction block; a residual reconstructor configured to generate a residual block for the target block based on information about the residual signals; and an adder configured to reconstruct the target block by adding the prediction block and the residual block.

Herein, the subpictures constituting the pictures are units displayable independently of each other.

DETAILED DESCRIPTION

Figure 1:
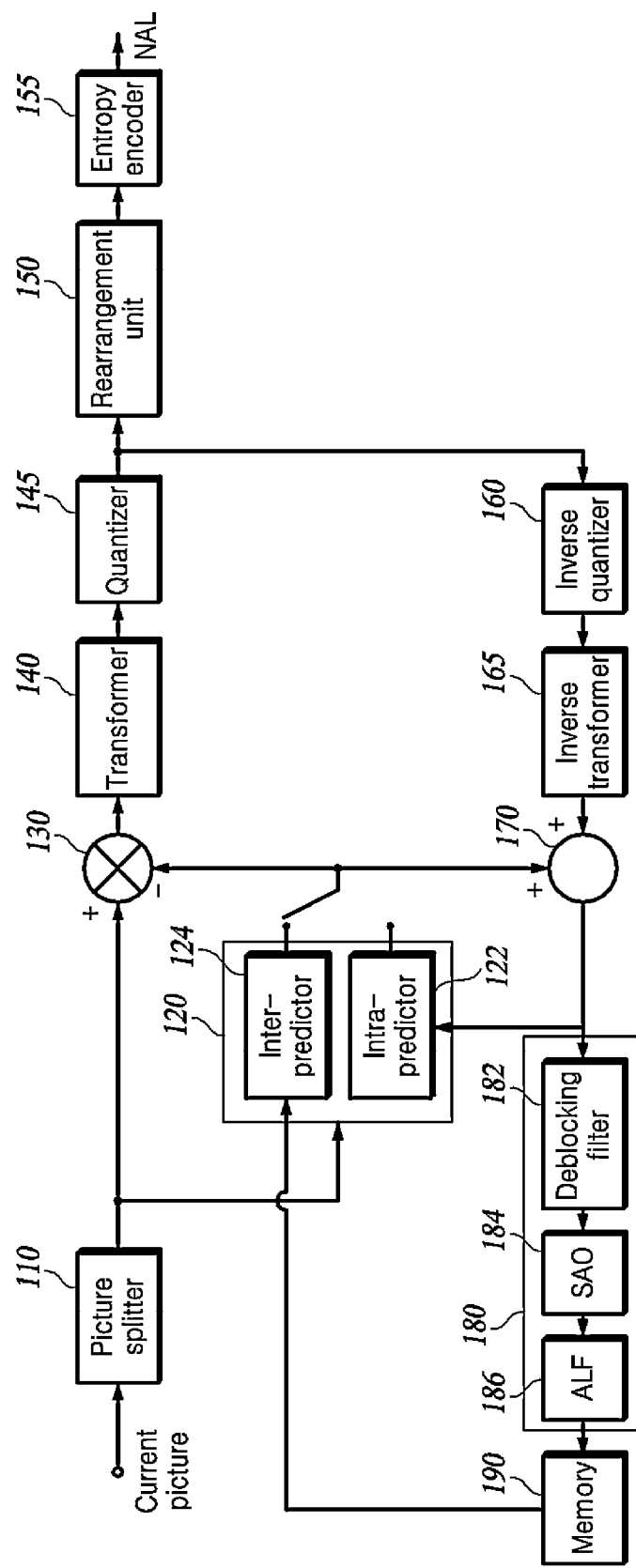
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, a reorganizer 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video typically includes a plurality of pictures. Each picture is split into a plurality of regions, and encoding is performed on each region. For example, one picture is split into one or more tiles and/or slices. The one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. Furthermore, information which a sequence composed of a plurality of pictures refers to in common is encoded in a sequence parameter set (SPS). Information applied to one tile or tile group in common may be encoded as a syntax of a tile or tile group header.

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. BTTT may be collectively referred to as a multiple-type tree (MTT).

Figure 2:
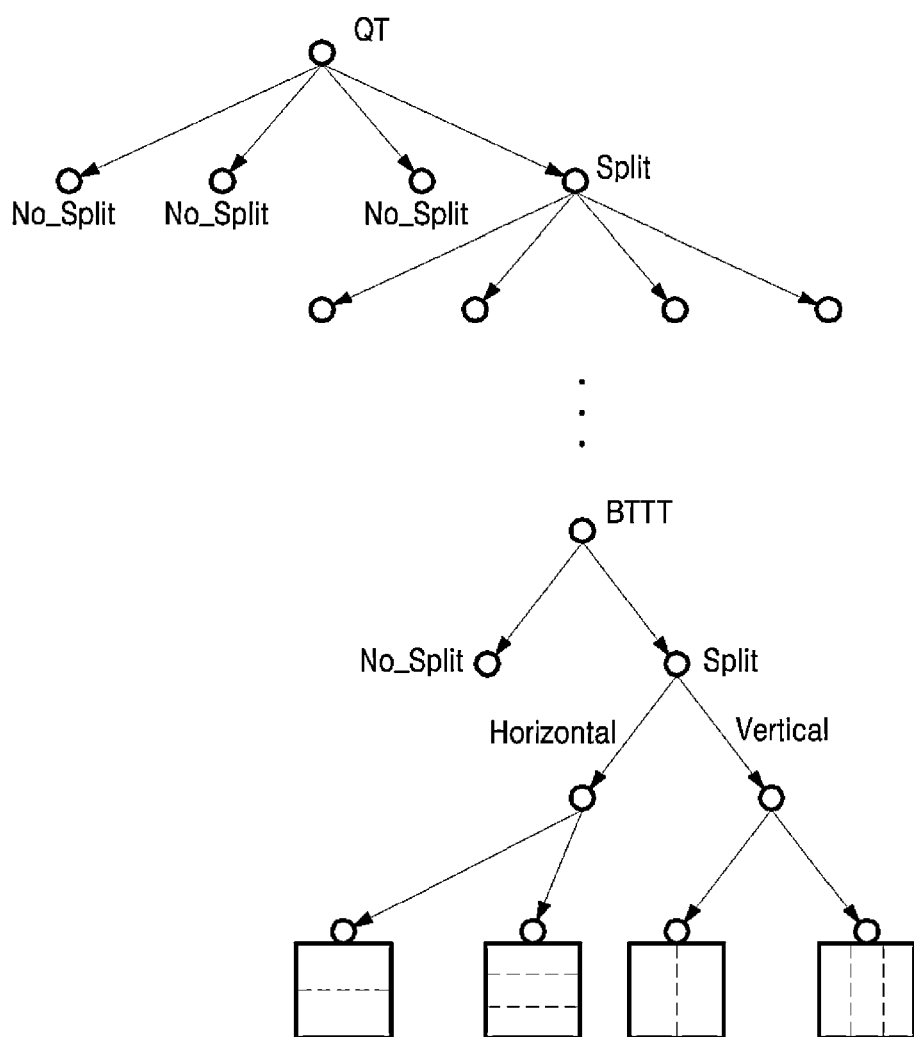
FIG. 2 is a diagram illustrating block splitting using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
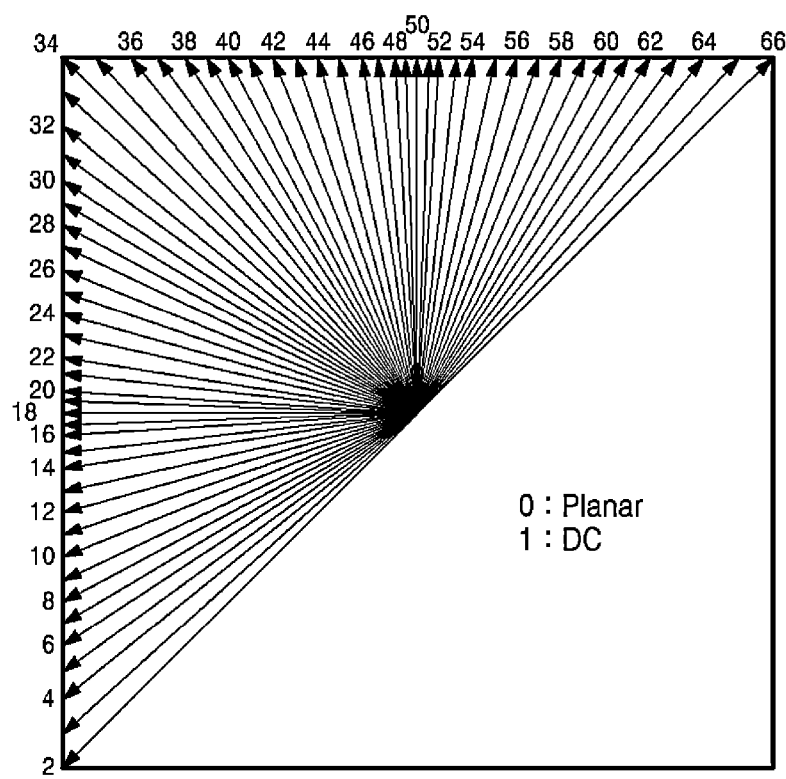
FIG. 3 is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus. The inter-predictor 124 may perform interpolation on a reference picture or a reference block in order to increase the accuracy of prediction. That is, subpixels between two consecutive integer pixels are interpolated by applying filter coefficients to a plurality of consecutive integer pixels including the two integer pixels. When a process of searching for a block that is most similar to the current block for the interpolated reference picture is performed, the motion vector may be expressed not to the precision of the integer pixel but to the precision of the decimal unit. The precision or resolution of the motion vector may be set differently for each unit of a target region to be encoded, such as a slice, tile, CTU, or CU.

The subtractor 130 subtracts the prediction block generated by the intra-predictor 122 or the inter-predictor 124 from the current block to generate a residual block.

The transformer 140 may split the residual block into one or more subblocks, and applies the transformation to the one or more subblocks, thereby transforming the residual values of the transform blocks from the pixel domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform residual signals in the residual block, using the entire size of the residual block as a transform unit. Alternatively, the residual block may be partitioned into a plurality of subblocks and the residual signals in a subblock may be transformed using the subblock as a transform unit.

The transformer 140 may individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 quantizes transform coefficients output from the transformer 140 using quantization parameters, and outputs the quantized transform coefficients to the entropy encoder 155. For some blocks or frames, the quantizer 145 may directly quantize a related residual block without transformation. The quantizer 145 may apply different quantization coefficients (scaling values) according to positions of the transform coefficients in the transform block. A matrix of quantization coefficients applied to quantized transform coefficients arranged in two dimensions may be encoded and signaled to the video decoding apparatus.

The reorganizer 150 may reorganize the coefficient values for the quantized residual value. The reorganizer 150 may change the 2-dimensional array of coefficients into a 1-dimensional coefficient sequence through coefficient scanning. For example, the reorganizer 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the reorganizer 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type. In addition, the entropy encoder 155 encodes information related to quantization, that is, information on quantization parameters and information on a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and transformation/quantization. The loop filter unit 180 may include one or more of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding, and performs filtering in a manner of adding a corresponding offset to each reconstructed pixel. The ALF 186 performs filtering on a target pixel to be filtered by applying filter coefficients to the target pixel and neighboring pixels of the target pixel. The ALF 186 may divide the pixels included in a picture into predetermined groups, and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 4:
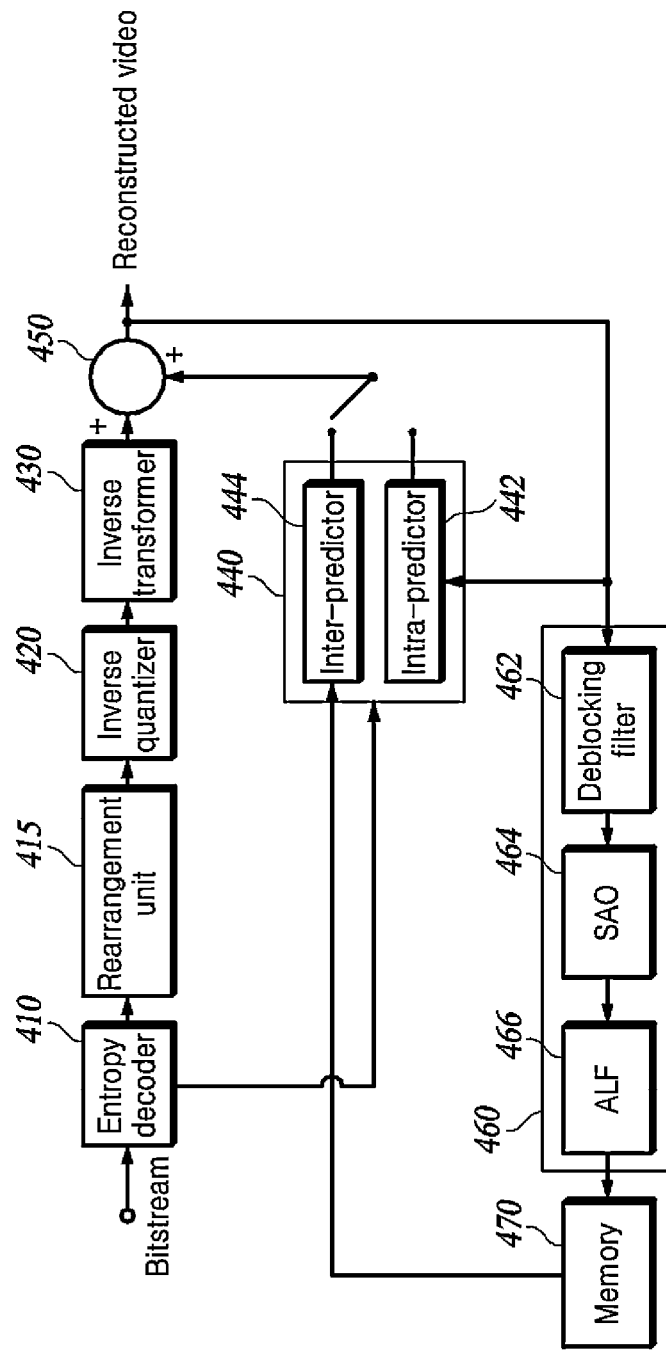
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a reorganizer 415, an inverse quantizer 420, an inverse transformer 430, a predictor 440, an adder 450, a loop filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

The entropy decoder 410 also extracts information about quantized transform coefficients of the current block as information related to quantization and information about residual signals.

The reorganizer 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients using the quantization parameter. The inverse quantizer 420 may apply different quantization coefficients (scaling values) to the quantized transform coefficients arranged in two dimensions. The inverse quantizer 420 may perform inverse quantization by applying a matrix of quantization coefficients (scaling values) from the video encoding apparatus to a two-dimensional array of quantized transform coefficients.

The inverse transformer 430 inversely transforms the inversely quantized transform coefficients from the frequency domain to the spatial domain to reconstruct residual signals, thereby generating a reconstructed residual block for the current block. In addition, when the MTS is applied, the inverse transformer 430 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode.

The inter-predictor 444 determines a motion vector of the current block and a reference picture referred to by the motion vector using the syntax element for the intra-prediction mode extracted from the entropy decoder 410, and predicts the current block based on the motion vector and the reference picture.

The adder 450 reconstructs the current block by adding the residual block output from the inverse transformer and the prediction block output from the inter-predictor or the intra-predictor. The pixels in the reconstructed current block are used as reference pixels in intra-predicting a block to be decoded next.

The loop filter unit 460 may include at least one of a deblocking filter 462, an SAO filter 464, and an ALF 466. The deblocking filter 462 deblocking-filters the boundary between the reconstructed blocks to remove blocking artifacts caused by block-by-block decoding. The SAO filter 464 performs filtering in a manner of adding the reconstructed block after deblocking filtering to corresponding offsets so as to compensate for a difference between the reconstructed pixel and the original pixel caused by lossy coding. The ALF 466 performs filtering on a target pixel to be filtered by applying filter coefficients to the target pixel and neighboring pixels of the target pixel. The ALF 466 may divide the pixels in a picture into predetermined groups, and then determine one filter to be applied to a corresponding group to differentially perform filtering on each group. The filter coefficient of the ALF is determined based on the information about the filter coefficient decoded from the bitstream.

The reconstructed block filtered through the loop filter unit 460 is stored in the memory 470. When all blocks in one picture are reconstructed, the reconstructed picture is used as a reference picture for inter-prediction of blocks in a picture to be encoded next.

As described above, the video encoding apparatus transmits a bitstream containing coded data about a video, and the video decoding apparatus decodes the bitstream to reconstruct each picture constituting the video.

Figure 5:
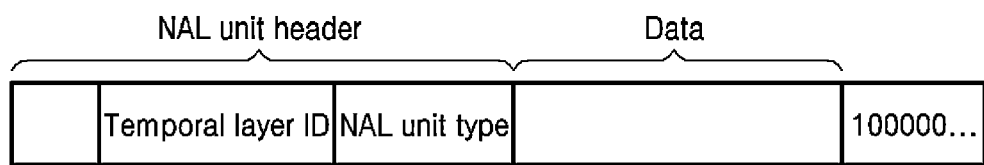
FIG. 5 is an exemplary diagram showing the structure of a bitstream.

In accordance with an aspect of the present disclosure, a bitstream may be composed of a plurality of transmission units, that is, network abstraction layer (NAL) units. As shown in FIG. 5, a NAL unit may include a NAL unit header and data carried through the NAL unit. In order to match the size of the NAL unit in bytes, a bit may be added to the rear part of the data constituting the NAL unit. The NAL unit header includes a NAL unit type for indicating the type of the data carried through the NAL unit and a temporal layer ID of the NAL unit.

According to the type of data included in the data field, NAL units may be classified into a video coding layer (VCL) type and a non-VCL type. A VCL type NAL unit is a NAL unit containing image data of a group of encoded pixels in the data field, and typically contains data about a coded slice. This means that the unit in which image data are transmitted is a slice. The non-VCL type NAL unit includes parameters necessary for decoding of data of a pixel group in the data field. NAL units including high level syntaxes such as an SPS including parameters shared at the sequence level (hereinafter referred to as a "first parameter set") or a PPS including parameters shared at one or more picture levels (hereinafter referred to as a "second parameter set"), correspond to non-VCL type NAL units. Whether the transmitted NAL unit is related to the first parameter set, the second parameter set, or a coded slice is indicated by the NAL unit type contained in the NAL unit header.

In addition, a NAL unit carrying a third parameter set including parameters commonly applied to a picture or a pixel group smaller than the picture, for example, one or more slices may be further defined. In the present disclosure, a bitstream representing one sequence includes one or more NAL units carrying third parameter sets.

Figure 6:
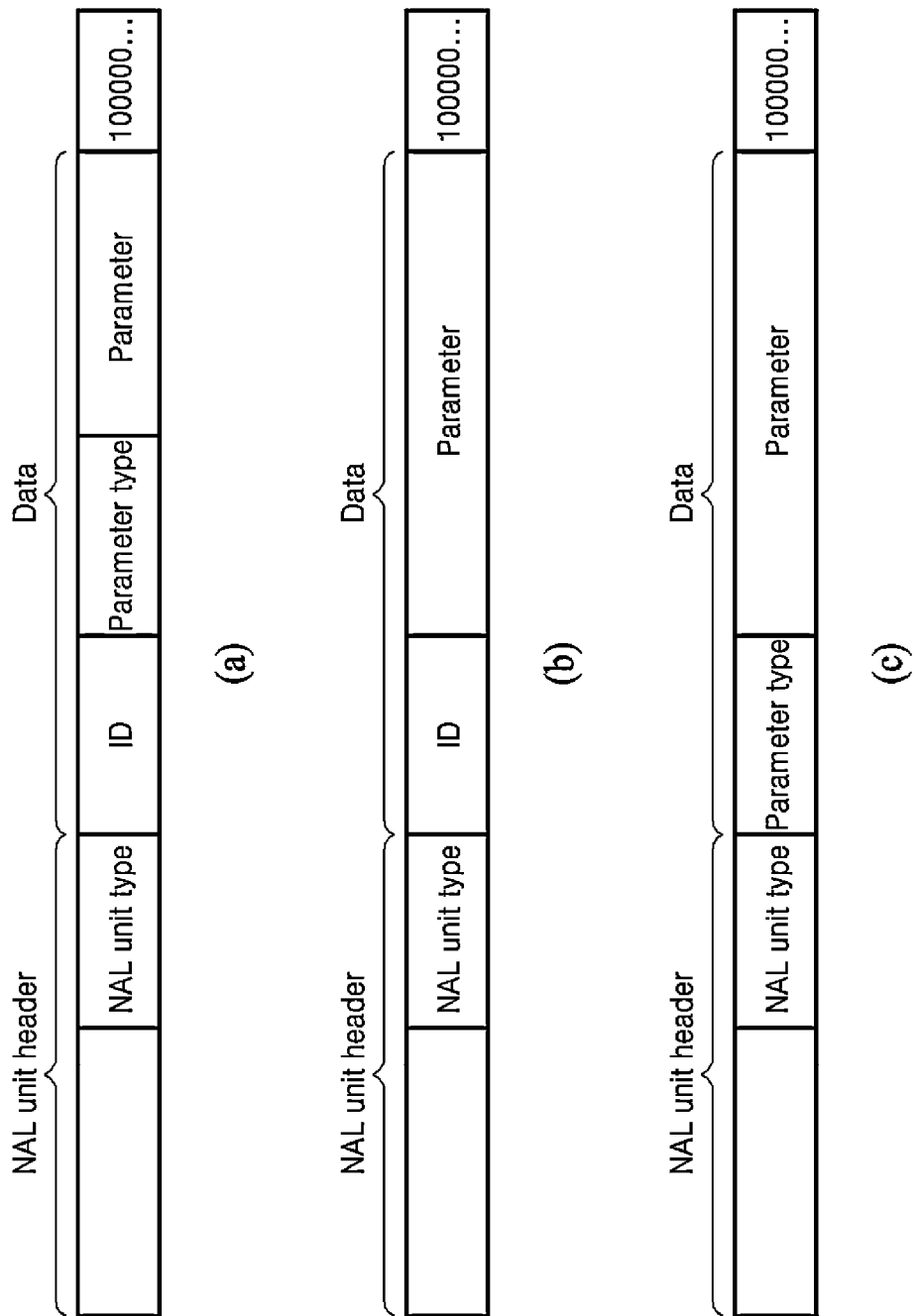
FIG. 6 is an exemplary diagram showing the structure of a NAL unit containing a third parameter set.

FIG. 6 is an exemplary diagram showing the structure of a NAL unit containing a third parameter set.

The third parameter set is contained in the data field of the NAL unit. The third parameter set includes at least one of ID information and parameter type information. It also includes parameters corresponding to the parameter type information.

Each third parameter set is associated with any one of a plurality of parameter types according to a coding tool with which the parameters carried by the set are associated. As shown in (A) of FIG. 6, information indicating the parameter type may be included in the third parameter set. The NAL unit type in the structure in (A) of FIG. 6 may indicate whether the NAL unit is related to the third parameter set by a specific index value. The types of parameters included in the third parameter set are identified by the parameter type information included in the third parameter set. Alternatively, as shown in (B) of FIG. 6, the parameter type may be indicated by the NAL unit type contained in the NAL unit header. In this case, NAL unit types are further subdivided according to the type of parameters included in the third parameter set. For example, in the structure of (B) of FIG. 6, the NAL unit type may have different index values according to the type of the parameter carried in the third parameter set. According to the value of the NAL unit type, whether data contained in the NAL unit is a third parameter set is identified and moreover the parameter type of the third parameter set is also identified. As another example, as shown in (C) of FIG. 6, only parameter type information may be contained in the data field of the NAL unit without ID information. In this case, the ID of the third parameter set is assigned according to the encoding or decoding order. ID values may be sequentially assigned in a decoding for each of the parameter types, or may be sequentially assigned according to a decoding order regardless of the parameter types.

The parameter type of the third parameter set may include, for example, a loop filtering type, a scaling list type, and a prediction information type. When the parameter type information is the loop filtering type, the third parameter set includes information on one or more sets of filter coefficients used for loop filtering. The filter coefficients belonging to each set may be expressed by an absolute value of the filter coefficient and a sign of the filter coefficient. When the parameter type information is the scaling list type, the third parameter set includes scaling values, i.e., coefficients of a quantization matrix, used for quantization of each transform coefficient. When the parameter type information is the prediction information type, the third parameter set includes a set of filter coefficients used in generating a prediction signal in a specific prediction mode.

The video decoding apparatus decodes NAL units related to the third parameter set and stores the third parameter sets in a memory. The ID and parameter type for the third parameter set are determined according to the decoding of the NAL units. For each parameter type, m parameter sets (where m is an integer greater than or equal to 1) may be stored in the memory, wherein m may vary according to the parameter type. When there are m parameter sets already stored in the memory, the video decoding apparatus deletes an existing parameter set and stores the newly decoded third parameter set. For example, a parameter type having the same ID and parameter type as the newly decoded third parameter set may be deleted from the memory. Alternatively, the oldest stored third parameter set may be deleted. Alternatively, the ID and parameter type information may be extracted from the bitstream to delete a third parameter set corresponding to the extracted information.

With the advent of various applications such as 360 video, a technology for not only displaying the entire region of a decoded picture but also a partial region of the picture is required. In order to support this technical requirement, another aspect of the present disclosure provides a method of partitioning pictures into a plurality of subpictures and encoding and decoding each subpicture. The present disclosure enables independent encoding or independent transmission of subpictures constituting each picture. In addition, data corresponding to each of the subpictures may be independently extracted or decoded from the entire bitstream. Furthermore, the partitioned subpictures from the pictures may be displayed independently of each other.

Figure 7:
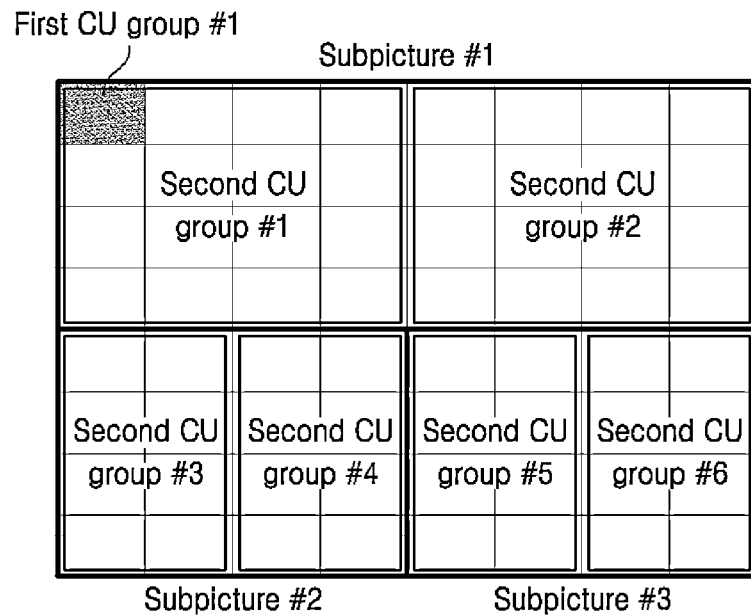
FIG. 7 is an exemplary diagram illustrating the layout of subpictures constituting each picture.

FIG. 7 is an exemplary diagram illustrating the layout of subpictures constituting each picture.

In order to represent the layout of partitioned subpictures from a picture, a group of coding units (CUs) may be defined. The CU group may be a CTU, a slice, a tile, or a grid of a predefined size. CU groups may be classified into a first CU group, which is a basic unit constituting a subpicture, and a second CU group composed of a plurality of first CU groups. For example, the first CU group may be a CTU, and the second CU group may be a slice corresponding to the transmission unit as mentioned above. A subpicture may be composed of one or more second CU groups. Hereinafter, for simplicity, it is assumed that the first CU group is a CTU and the second CU group is a slice, but it is apparent that the present invention is not necessarily limited thereto. For example, the first CU group may be a grid having a predefined size, and the second CU group may be a slice or a tile.

The layout information is represented by the number of subpictures in the picture, the ID of each subpicture, and the position and size of each subpicture in the picture. The position and size of each subpicture may be expressed as information for identifying CTUs constituting each subpicture.

CTUs constituting each subpicture may be identified by the first CTU and the last CTU constituting the subpicture in raster scan order. For a rectangular subpicture, the first CTU and the last CTU in raster scan order mean a CTU located at the top left and a CTU located at the bottom right in each subpicture. Accordingly, the information for identifying CTUs constituting a subpicture may include identification information for identifying the position of the top left CTU (e.g., coordinate information about the top left CTU) and identification information for identifying the CTU located at the bottom right (e.g., coordinate information about the bottom right CTU). Alternatively, the information for identifying CTUs constituting a subpicture may be expressed by identification information for identifying the position of the top left CTU, the number of CTUs in the horizontal direction of the subpicture, and the number of CTUs in the vertical direction.

Figure 8:
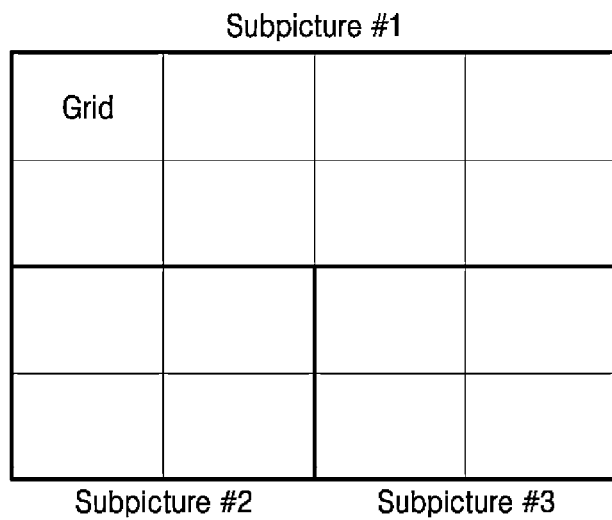
FIG. 8 is another exemplary diagram illustrating the layout of subpictures constituting each picture.

FIG. 8 is another exemplary diagram illustrating the layout of subpictures constituting each picture.

In the example of FIG. 8, the first CU group, which is a basic unit constituting a subpicture, is a grid into which a plurality of pixels are grouped. The subpicture may be a group of grids.

Layout information about subpictures may be represented by the grids. As layout information about subpictures in a picture, the size of the grid is first defined. The size of the grid may be defined by the horizontal and vertical lengths of the grid, or the number of grids in the horizontal and vertical directions of a picture.

The layout information about subpictures includes the number of subpictures in the picture, the ID of each subpicture, and identification information for identifying a grid constituting each subpicture. For example, the identification information includes identification information about the first grid and identification information about the last grid in raster scan order within a subpicture. In a rectangular subpicture, the first grid corresponds to the top left grid in the subpicture, and the last grid corresponds to the bottom right grid within the subpicture. Accordingly, the identification information includes identification information about the top left grid and the bottom right grid in the subpicture. Alternatively, the identification information may include identification information about the top left grid in the subpicture and information about the number of grids in the horizontal and vertical directions. In an implementation example, the identification information may be the position of the grid. In another implementation example, the identification information may be expressed as an ID or address of the grid. IDs or addresses of grids in a picture may be assigned in ascending order starting from 0 according to a specific scan order, for example, raster scan order.

The video encoding apparatus encodes partition information for partitioning each picture into subpictures, that is, layout information. The layout information may be included in the aforementioned first parameter set or second parameter set. The video decoding apparatus extracts the layout information included in the first parameter set or the second parameter set to identify subpictures constituting each picture.

The video encoding apparatus encodes a subpicture ID for each slice, which is a transmission unit. The video decoding apparatus may determine which subpicture the slice belongs to, by extracting the subpicture ID on a per slice basis. In addition, each subpicture is reconstructed by decoding blocks in one or more slices constituting the subpicture through the above-described decoding process.

Subpictures should be allowed to be independently transmitted and encoded/decoded, and to be displayed independently of each other. Accordingly, the video encoding apparatus and the video decoding apparatus of the present disclosure may carry out a process of disallowing reference to reconstructed pixels outside the subpicture boundary in the process of encoding or decoding the subpicture. Boundaries of subpictures may be identified by the layout information.

In an embodiment, the predictor 120 of the video encoding apparatus and the predictor 440 of the video decoding apparatus predict the pixels within the current block from the pre-reconstructed pixels based on the prediction information (inter-prediction information or intra-prediction information) about the current block. When the pixel position determined based on the prediction information is outside the boundary of the current subpicture, the predictors 120 and 440 predicts a pixel in the current block based on an alternative pixel in place of the pre-reconstructed pixel at the determined position, even when the pre-reconstructed pixel is present at the determined position. The alternative pixel may have a predefined fixed pixel value, or may be a pixel at a predefined position in the current subpicture, for example, a pixel in contact with the subpicture boundary in the current subpicture.

The process of using the alternative pixel instead of the pre-reconstructed pixel outside the boundary of the current subpicture may be involved in various prediction processes. For example, when pre-reconstructed reference pixels which are around the current block and used for intra-prediction of the current block are outside the boundary of the subpicture, the reference pixels may be replaced with a predefined fixed pixel value. As another example, when at least some of the integer pixels used for interpolation of subpixels in inter-prediction are outside the boundary of the current subpicture, integer pixels adjacent to the boundary in the subpicture may be used in place of the integer pixels outside the boundary of the current subpicture.

In another embodiment, the loop filter unit 180 of the video encoding apparatus and the loop filter unit 460 of the video decoding apparatus may perform loop filtering on a target pixel to be filtered by applying filter coefficients to the target pixel and neighboring pixels around the target pixel in the current reconstructed block. When at least one of the neighboring pixels is outside the boundary of the current subpicture, the loop filter units 180 and 460 perform loop filtering on the target pixel based on an alternative pixel instead of the neighboring pixels outside the boundary of the current subpicture. The alternative pixel may have a predefined fixed pixel value, or may be a pixel at a predefined position within the current subpicture, for example, a pixel that is in the current subpicture and is in contact with the boundary of the current subpicture.

Filter coefficients to be used for loop filtering may be determined from the above-described third parameter sets. The video encoding apparatus signals ID information about a third parameter set related to a loop filtering type for each CU group, for example, for each slice. The video decoding apparatus decodes the ID information about a third parameter set related to loop filtering from a header of a CU group, such as a slice header, and selects a third parameter set corresponding to the decoded ID information from among the third parameter sets stored in the memory.

ID information about a plurality of third parameter sets related to loop filtering may be signaled on a per slice basis. To this end, information about the number of IDs of the third parameter sets included in the slice is signaled first, and pieces of ID information about the third parameter sets as many as the number is signaled. The number of the signaled pieces of ID information may vary depending on a color component of pixels to be filtered, that is, depending on whether the color component is luma or chroma. For example, in the case of the luma component, the number of pieces of ID information is signaled first, and pieces of ID information about the third parameter sets corresponding to the number is signaled. On the other hand, in the case of the chroma component, a single third parameter set of the loop filtering type may always be used. Therefore, only one piece of ID information may be signaled without signaling information on the number of pieces of ID information.

Filter coefficients to be applied to blocks in a slice may be determined in a per CTU basis using third parameter sets selected in a per slice basis. All blocks included in one CTU share the same filter coefficients.

As described above, each third parameter set may include one or more filter coefficient sets. One filter coefficient set includes a plurality of filter coefficients. The number of filter coefficients is determined depending on the number of pixels used to filter one pixel. For example, when n pixels (the filtering target pixel and pixels around the target pixel) in total are used to filter one pixel, the one filter set includes n filter coefficients corresponding to the n pixels.

The video encoding apparatus signals filter information for loop filtering of a corresponding CTU on a per CTU basis. The video decoding apparatus uses the signaled filter information to determine a set of filter coefficients to be applied to the CTU on a per CTU basis.

In an embodiment in which one third parameter set is selected on a per slice basis, filter index information indicating one filter coefficient set from among filter coefficient sets included in the one third parameter set may be signaled on a per CTU basis.

In another embodiment in which a plurality of third parameter sets is determined a per slice basis, parameter ID information indicating which of the plurality of third parameter sets is to be used may be signaled on a per CTU basis. In addition, filter index information indicating one filter coefficient set among filter coefficient sets included in the third parameter set corresponding to the parameter ID information may be additionally signaled. Alternatively, a filter coefficient set to use among the filter coefficient sets included in the third parameter set corresponding to the parameter ID information may be derived based on the characteristics of the target pixel to be filtered in the CTU. For example, characteristics such as directionality or activity of the target pixel may be calculated using the target pixel and surrounding pixels, and a set of filter coefficients to be applied to each target pixel is selected according to the calculated characteristics. Characteristics of a pixel, such as a direction or activity of a target pixel, may be calculated through a gradient operation based on the target pixel and the neighboring pixels therearound, for example, pixels within a predetermined region including the target pixel. In this alternative embodiment, signaling for filter index information indicating which filter coefficient set to use among filter coefficient sets included in the third parameter set corresponding to the parameter ID information is not required. The video encoding apparatus and the video decoding apparatus may calculate characteristics of a target filter and select a filter set according to the calculated characteristics.

A predefined plurality of filter coefficient sets may be further used in addition to the filter coefficient sets included in the third parameter sets. The predefined plurality of filter coefficient sets may be filter coefficient sets determined for one or more CTUs decoded immediately before the current CTU in decoding order, or may be filter coefficient sets determined for neighboring CTUs at a predefined position adjacent to the current CTU (e.g., a CTU positioned at the top and/or left side of the current CTU). Alternatively, the plurality of predefined filter coefficient sets may be filter coefficient sets fixedly preset for all CTUs. Hereinafter, preset filter coefficient sets used in the previously decoded CTU are referred to as a "filter set reference list." First, information indicating whether the filter set reference list is used for the current CTU is signaled.

When the filter set reference list is not used, one or more of parameter ID information and filter index information among the third parameter sets may be signaled for the filter coefficient set to be used in the current CTU, and the video decoding apparatus derive a filter coefficient set to be applied to the current CTU or each pixel in the current CTU based on the signaled information as described above.

When the filter set reference list is used, a filter set to be applied to the current CTU is selected from among the filter sets included in a preset filter set reference list. The selection may be performed by the filter index information signaled from the video encoding apparatus to the video decoding apparatus, or may be inferred for each pixel according to the characteristics after calculating the characteristics of each pixel in the current CTU as described above.

Subpictures reconstructed through the above-described decoding process are displayable independently of each other. The subpictures may be stored in different storage spaces in a memory or may be individually stored in multiple memories.

When a plurality of subpictures is stored in the same memory, the subpictures may be stored with a predetermined space therebetween.

The memory storage structure in units of subpictures may be signaled from the video encoding apparatus to the video decoding apparatus on a per picture basis or a per subpicture basis, or may be derived by indexes, coordinates, and reference relationships of the subpictures. As an example, a plurality of subpictures that do not have a reference relationship may be stored in different memories. As another example, a plurality of subpictures having the same position, the same size, the same subpicture index, or the same memory index may be stored in the same memory.

A plurality of reconstructed subpictures stored in different memories may be stored in the same memory before being displayed. A plurality of reconstructed subpictures that are inconsecutively stored in the same memory may be consecutively stored before being displayed.

Figure 9:
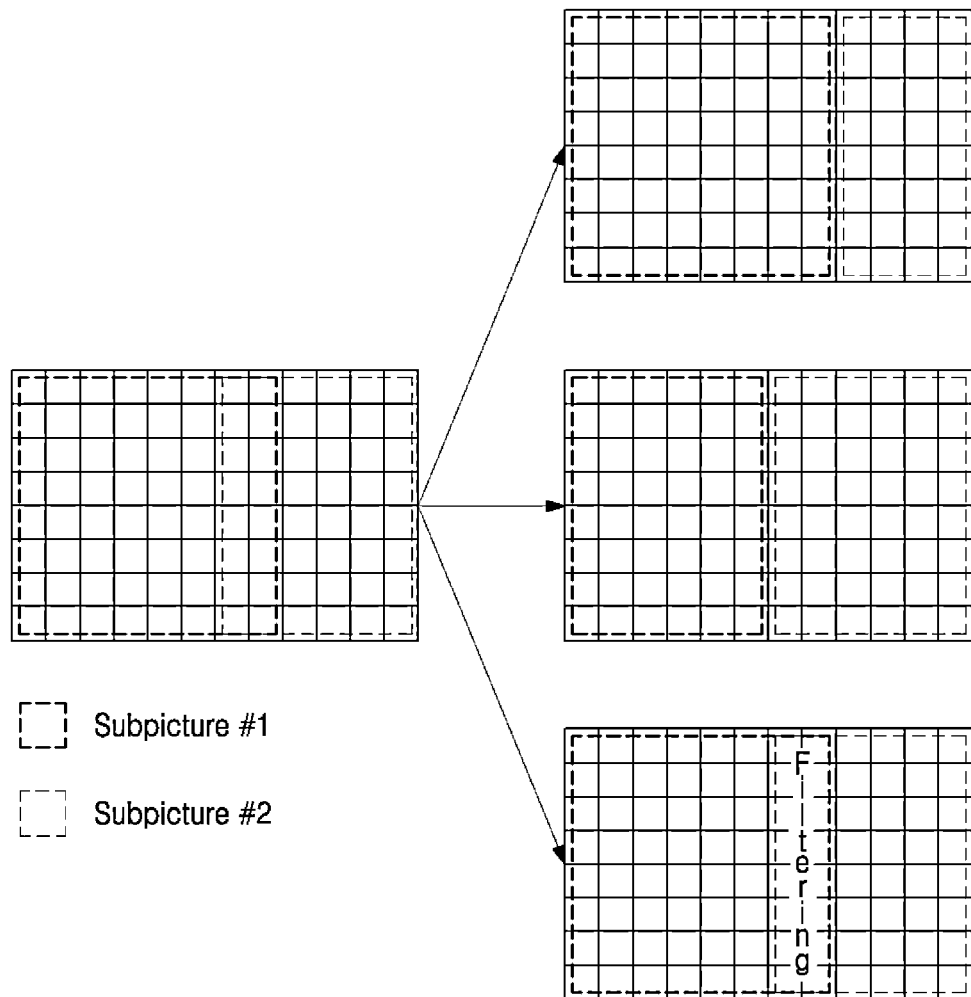
FIG. 9 is an exemplary diagram illustrating a method of processing subpictures overlapping each other.

As shown in FIG. 9, each picture may be partitioned into a plurality of subpictures so as to have a region having overlapping subpictures. The video decoding apparatus may select a pixel of one subpicture from among the pixels in different subpictures constituting the overlapping region, and store or display the same in the memory. The selection of a pixel in a subpicture may be signaled from the video encoding apparatus to the video decoding apparatus. Alternatively, the video decoding apparatus may derive pixel values in the overlapping region to be stored or displayed by applying a mathematical operation such as averaging or weighted averaging to a plurality of subpictures constituting the overlapping region.

It should be understood that the exemplary embodiments described above may be implemented in many different ways. The functions described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding apparatus for decoding a bitstream containing an encoded sequence of pictures which are partitioned into a plurality of subpictures including a plurality of coding tree blocks, the apparatus comprising at least one processor configured to:

decode, from the bitstream, information on a coding tree block size and layout information about the subpictures which are partitioned from the pictures included in the sequence;

split, in a tree structure, a to-be-decoded coding tree block among the coding tree blocks which have the coding tree block size in any one of the subpictures identified by the layout information and determine a target block;

decode, from the bitstream, prediction information for predicting the target block and information about residual signals of the target block;

predict pixels in the target block based on the prediction information and generate a prediction block;

obtain transform coefficients based on the information about the residual signals;

dequantize the transform coefficients;

generate a residual block for the target block by inverse transforming the dequantized transform coefficients;

reconstruct the target block by adding the prediction block and the residual block; and perform loop filtering on a target pixel to be filtered in the reconstructed target block by applying filter coefficients to the target pixel and neighboring pixels of the target pixel, wherein, when at least one of the neighboring pixels is outside the boundary of a subpicture including the target block, the loop filtering is performed on the target pixel based on an alternative pixel in place of the at least one of the neighboring pixels, wherein, the alternative pixel is a pixel in the subpicture which is adjacent to the boundary of the subpicture, wherein, the layout information includes a number of the subpictures, identification information for identifying a position of a first coding tree block in a raster scan order within each of the subpictures, and information about subpicture sizes, wherein, the identification information is information for identifying a position of a coding tree block located at a top left in each of the subpictures, wherein, the information about the subpicture sizes includes a width of each of the subpictures in units of coding tree block size, which is determined by the information on the coding tree block size, and a height of each of the subpictures in units of coding tree block size, wherein, widths of the subpictures are identified using the information on the coding tree block size and the width of each of the subpictures in units of coding tree block size and heights of the subpictures are identified using the information on the coding tree block size and the height of each of the subpictures in units of coding tree block size, each of the subpictures is composed of one or more slices including a plurality of coding tree blocks, wherein ID information indicating one or more parameter sets related to the loop filtering is decoded from a header of a slice containing the target block positioned therein, wherein one or more filter coefficient sets for the loop filtering of blocks in the slice are reconstructed from the one or more parameter sets corresponding to the ID information decoded from the header of the slice, wherein a filter coefficient set to be used for the to-be-decoded coding tree block including the target block is selected either from the one or more filter coefficient sets reconstructed from the parameter set or from pre-defined filter coefficient sets, based on information about filter coefficient sets applied to the to-be-decoded coding tree block, and wherein the loop filtering on the target pixel is performed using filter coefficients in the selected filter coefficient set for the to-be-decoded coding tree block.

2. The apparatus of claim 1, wherein the subpictures are units displayable independently of each other.

3. The apparatus of claim 1, wherein when a pre-reconstructed pixel at a position determined based on the prediction information is outside a boundary of a subpicture including the target block, the at least one processor is further configured to:

predict a pixel in the target block based on an alternative pixel in place of the pre-reconstructed pixel.

4. The apparatus of claim 1, wherein the bitstream contains a first parameter set carrying parameters commonly applied to a level of the sequence, and a second parameter set carrying parameters commonly applied to a level of the pictures, wherein the layout information is decoded from the first parameter set or the second parameter set.

5. The apparatus of claim 4, wherein the bitstream contains one or more third parameter sets carrying parameters commonly applied to a pixel group having a size less than or equal to the picture, wherein each of the third parameter sets includes ID information, type information indicating a type of parameters carried therein among a plurality of parameter types, and parameters corresponding to the type information, wherein the plurality of parameter types includes at least a parameter type related to the loop filtering.

6. The apparatus of claim 4, wherein each of the subpictures is composed of one or more slices including a plurality of coding tree blocks.

7. A video encoding apparatus for encoding a sequence of pictures which are partitioned into a plurality of subpictures including a plurality of coding tree blocks into a bitstream, the apparatus comprising at least one processor configured to:

encode, into the bitstream, information on a coding tree block size and layout information about the subpictures which are partitioned from the pictures included in the sequence;

split, in a tree structure, a to-be-encoded coding tree block among the coding tree blocks which have the coding tree block size in any one of the subpictures, and determine a target block;

encode, into the bitstream, prediction information for predicting the target block;

generate a prediction block based on the prediction information;

generate a residual block based on the target block and the prediction block;

transform the residual block to generate transform coefficients;

quantize the transform coefficients;

encode the quantized transform coefficients; and perform loop filtering on a target pixel to be filtered in a reconstructed target block by applying filter coefficients to the target pixel and neighboring pixels of the target pixel, wherein, when at least one of the neighboring pixels is outside the boundary of a subpicture including the target block, the loop filtering is performed on the target pixel based on an alternative pixel in place of the at least one of the neighboring pixels, wherein, the alternative pixel is a pixel in the subpicture which is adjacent to the boundary of the subpicture, wherein, the layout information includes a number of the subpictures, identification information for identifying a position of a first coding tree block in a raster scan order within each of the subpictures, and information about subpicture sizes, wherein, the identification information is information for identifying a position of a coding tree block located at a top left in each of the subpictures, wherein, the information about the subpicture sizes includes a width of each of the subpictures in units of coding tree block size, which is determined by the information on the coding tree block size, and a height of each of the subpictures in units of coding tree block size, wherein, the information on the coding tree block size and the width of each of the subpictures in units of coding tree block size is encoded to identify widths of the subpictures, wherein, the information on the coding tree block size and the height of each of the subpictures in units of coding tree block size is encoded to identify heights of the subpictures, wherein ID information indicating one or more parameter sets related to the loop filtering is encoded into a header of a slice containing the target block positioned therein, the one or more parameter sets containing information on one or more filter coefficient sets for the loop filtering of blocks in the slice, wherein a filter coefficient set to be used for the to-be-encoded coding tree block including the target block is selected either from the one or more filter coefficient sets contained in the one or more parameter sets or from pre-defined filter coefficient sets, and information for selecting the filter coefficient set to be used for the to-be-encoded coding tree block is encoded, and wherein the loop filtering on the target pixel is performed using filter coefficients in the selected filter coefficient set for the to-be-encoded coding tree block.

8. A method for transmitting a bitstream associated with video data, the method comprising:

generating the bitstream by encoding the video data; and transmitting the bitstream to a video decoding apparatus, wherein generating the bitstream comprises:

encoding, into the bitstream, information on a coding tree block size and layout information about subpictures which are partitioned from pictures included in a sequence;

splitting, in a tree structure, a to-be-encoded coding tree block among a plurality of coding tree blocks which have the coding tree block size in any one of the subpictures, and determining a target block;

encoding, into the bitstream, prediction information for predicting the target block;

generating a prediction block based on the prediction information;

generating a residual block based on the target block and the prediction block;

transforming the residual block to generate transform coefficients;

quantizing the transform coefficients;

encoding the quantized transform coefficients; and performing loop filtering on a target pixel to be filtered in a reconstructed target block by applying filter coefficients to the target pixel and neighboring pixels of the target pixel, wherein, when at least one of the neighboring pixels is outside the boundary of a subpicture including the target block, the loop filtering is performed on the target pixel based on an alternative pixel in place of the at least one of the neighboring pixels, wherein the alternative pixel is a pixel in the subpicture which is adjacent to the boundary of the subpicture, wherein, the layout information includes a number of the subpictures, identification information for identifying a position of a first coding tree block in a raster scan order within each of the subpictures, and information about subpicture sizes, wherein, the identification information is information for identifying a position of a coding tree block located at a top left in each of the subpictures, wherein, the information about the subpicture sizes includes a width of each of the subpictures in units of coding tree block size which is determined by the information on the coding tree block size and a height of each of the subpictures in units of coding tree block size, wherein, the information on the coding tree block size and the width of each of the subpictures in units of coding tree block size is encoded to identify widths of the subpictures, wherein, the information on the coding tree block size and the height of each of the subpictures in units of coding tree block size is encoded to identify heights of the subpictures, wherein ID information indicating one or more parameter sets related to the loop filtering is encoded into a header of a slice containing the target block positioned therein, the one or more parameter sets containing information on one or more filter coefficient sets for the loop filtering of blocks in the slice, wherein a filter coefficient set to be used for the to-be-encoded coding tree block including the target block is selected either from the one or more filter coefficient sets contained in the one or more parameter sets or from pre-defined filter coefficient sets, and information for selecting the filter coefficient set to be used for the to-be-encoded coding tree block is encoded, and wherein the loop filtering on the target pixel is performed using filter coefficients in the selected filter coefficient set for the to-be-encoded coding tree block.

* * * * *